US012699940B1

(12) United States Patent
Busey et al.

(10) Patent No.: US 12,699,940 B1
(45) Date of Patent: Aug. 4, 2026

(54) SYSTEMS AND METHODS FOR IDENTIFYING CHANGES TO COMPUTATIONAL WORKFLOWS AND GENERATING NOTIFICATIONS

(71) Applicant: Form Bio Inc., Austin, TX (US)

(72) Inventors: Andrew Busey, Austin, TX (US);
Brandi Lynn Cantarel, Richardson, TX (US); Douglas James Daniels, Jr., Austin, TX (US)

(73) Assignee: Form Bio Inc., Austin, TX (US)

( * ) Notice: Subject to any disclaimer, the term of this patent is extended or adjusted under 35 U.S.C. 154(b) by 711 days.

(21) Appl. No.: 17/816,935

(22) Filed: Aug. 2, 2022

(51) Int. Cl.
*G06Q 10/0633* (2023.01)

(52) U.S. Cl.
CPC .............................. *G06Q 10/0633* (2013.01)

(58) Field of Classification Search
None
See application file for complete search history.

(56) References Cited

U.S. PATENT DOCUMENTS

| | | | | |
|---|---|---|---|---|
| 6,986,138 | B1 * | 1/2006 | Sakaguchi | G06Q 10/0633 |
| | | | | 709/201 |
| 7,653,562 | B2 * | 1/2010 | Schulz | G06Q 10/103 |
| | | | | 705/7.27 |
| 8,577,709 | B2 * | 11/2013 | Ohsaki | G06Q 10/06316 |
| | | | | 705/7.13 |
| 8,639,555 | B1 * | 1/2014 | Johnston | G06Q 10/0631 |
| | | | | 705/7.27 |
| 10,474,977 | B2 * | 11/2019 | Stevens | G06F 9/485 |
| 10,528,327 | B2 * | 1/2020 | Kumar | G06F 8/10 |
| 10,929,107 | B2 * | 2/2021 | Burman | G06F 8/34 |
| 11,609,890 | B1 | 3/2023 | Vermeulen | |
| 2003/0004770 | A1 * | 1/2003 | Miller | G06Q 10/10 |
| | | | | 717/102 |
| 2005/0209904 | A1 * | 9/2005 | Hayashi | G06Q 10/06311 |
| | | | | 705/26.1 |

(Continued)

FOREIGN PATENT DOCUMENTS

| | | | | |
|---|---|---|---|---|
| WO | WO-2008092026 | A1 * | 7/2008 | ....... G06Q 10/06316 |

OTHER PUBLICATIONS

Singh, Alok, et al. "A machine learning approach for modular workflow performance prediction." Proceedings of the 12th workshop on workflows in support of large-scale science. 2017. (Year: 2017).*

*Primary Examiner* — Brian M Epstein
*Assistant Examiner* — Derick J Holzmacher
(74) *Attorney, Agent, or Firm* — Esplin & Associates, PC

(57) ABSTRACT

Systems and methods for identifying changes to computational workflows and generating notifications. Exemplary implementations may: store a workflow repository and a user repository; monitor the workflow repository to detect changes to workflow definitions and/or computational modules included in the workflow repository; responsive to detections of changes to the workflow definitions and/or computational modules, identify computational workflows defined by workflow definitions impacted by the detected changes; identify, based on information included in the user repository, users associated with the identified computational workflows; generate notifications for the identified users; output the notifications to the identified user; and/or other exemplary implementations.

20 Claims, 3 Drawing Sheets

(56)　　　　　References Cited

U.S. PATENT DOCUMENTS

| | | | |
|---|---|---|---|
| 2008/0027782 A1* | 1/2008 | Freire | G06F 9/451 |
| | | | 705/7.26 |
| 2008/0177612 A1* | 7/2008 | Starink | G06Q 10/06 |
| | | | 235/376 |
| 2009/0316977 A1* | 12/2009 | Juncker | G06Q 40/12 |
| | | | 382/133 |
| 2010/0010953 A1* | 1/2010 | Meliksetian | G06Q 10/06 |
| | | | 718/100 |
| 2012/0095585 A1* | 4/2012 | Agarwal | G06Q 10/103 |
| | | | 700/109 |
| 2012/0096463 A1* | 4/2012 | Agarwal | G06Q 10/0633 |
| | | | 718/100 |
| 2014/0025425 A1* | 1/2014 | Chalana | G06Q 10/0633 |
| | | | 705/7.27 |
| 2015/0039382 A1* | 2/2015 | Kim | G06Q 10/06 |
| | | | 705/7.27 |
| 2015/0161536 A1* | 6/2015 | Mikheev | G06F 16/283 |
| | | | 705/7.27 |
| 2015/0161537 A1* | 6/2015 | Mikheev | G06Q 10/0633 |
| | | | 705/7.27 |
| 2016/0034809 A1* | 2/2016 | Trenholm | G06F 8/30 |
| | | | 706/20 |
| 2017/0017912 A1* | 1/2017 | Teraguchi | G06Q 10/06313 |
| 2017/0039492 A1* | 2/2017 | Henke | G06Q 10/0633 |
| 2017/0147296 A1* | 5/2017 | Kumar | G06Q 10/06 |
| 2017/0315714 A1* | 11/2017 | Shyamsundar | G06F 3/04847 |
| 2017/0315789 A1* | 11/2017 | Lam | G06Q 10/0633 |
| 2017/0316355 A1* | 11/2017 | Shrestha | G06Q 10/067 |
| 2018/0081717 A1* | 3/2018 | Li | G06Q 10/06 |
| 2018/0089602 A1* | 3/2018 | Elvira | G06Q 10/0633 |
| 2018/0240051 A1* | 8/2018 | Chen | G06Q 10/0633 |
| 2019/0026663 A1* | 1/2019 | Homeyer | G06Q 10/06316 |
| 2019/0129762 A1* | 5/2019 | Stevens | G06F 9/485 |
| 2019/0129769 A1* | 5/2019 | Frech | G06F 8/34 |
| 2019/0196672 A1* | 6/2019 | Mikheev | G06Q 10/06 |
| 2019/0213040 A1 | 7/2019 | Ohba | |
| 2019/0279127 A1* | 9/2019 | Togo | G06F 3/048 |
| 2020/0012977 A1* | 1/2020 | Lehmann | G06Q 10/06316 |
| 2020/0045021 A1* | 2/2020 | Martin | H04L 9/30 |
| 2020/0065152 A1* | 2/2020 | Parmar | G06F 9/5027 |
| 2020/0151288 A1 | 5/2020 | Ma | |
| 2020/0202273 A1* | 6/2020 | Lehmann | G06Q 10/06316 |
| 2020/0301678 A1* | 9/2020 | Burman | G06F 9/541 |
| 2021/0383289 A1* | 12/2021 | Dmitriev | G06F 9/3555 |
| 2022/0374793 A1 | 11/2022 | Jezewski | |
| 2022/0411881 A1 | 12/2022 | Kural | |
| 2023/0316188 A1 | 10/2023 | Vasileiadis | |

* cited by examiner

SYSTEMS AND METHODS FOR IDENTIFYING CHANGES TO COMPUTATIONAL WORKFLOWS AND GENERATING NOTIFICATIONS

FIELD OF THE DISCLOSURE

The present disclosure relates to systems and methods for identifying changes to computational workflows and generating notifications.

BACKGROUND

Methods for modularizing computational processes are known. Methods for customizing computational workflows are known. Bioinformatics programs for converting between file types and/or formats, performing analyses on biological data, and/or performing other functions are known. Methods for updating software are known.

SUMMARY

Computational modules may be selected and/or arranged to customize a computational workflow for processing information. The computational modules may be selected and/or arranged in a relative order that defines the computational workflow and/or the order of operations that are performed on inputs to the computational workflow. Updates to computational workflows may become available after the computational workflows have been used to process inputs to produce outputs. The updates to the computational workflows may include updates to the computational modules included in the computational workflows and/or other components of the computational workflows. The updates may provide improvements by modifying (i.e., providing new versions of) the computational workflows and/or altering the way inputs are processed by the computational workflows. Therefore, there is a need to monitor the computational workflows and swiftly notify users when updates to the computational workflows have been implemented and/or become available.

One or more aspects of the present disclosure include a system for identifying changes to computational workflows and generating notifications in accordance with the updated computational workflows. The system may include electronic storage, one or more hardware processors configured by machine-readable instructions and/or other components. Executing the machine-readable instructions may cause the one or more hardware processors to facilitate identifying changes to computational workflows and generating notifications in accordance with the updated computational workflow. The machine-readable instructions may include one or more computer program components. The one or more computer program components may include one or more of a detection component, a workflow component, a user component, a notification component and/or other components The electronic storage may be configured to store a workflow repository, a user repository, and/or other information. The workflow repository may include workflow definitions, computational modules, and/or other information. The workflow definitions may define computational workflows by specifying computational modules and/or relative orders of computational modules to configure the computational workflows. Computational modules may define separate sets of operations to perform on module inputs to the computational modules to generate module outputs. The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user, and the first user may be associated with the first computational workflow.

The detection component may be configured to monitor the workflow repository to detect changes to workflow definitions and/or computational modules included in the workflow repository. By way of non-limiting illustration, changes may include updates to the workflow definitions and/or computational modules.

The workflow component may be configured to, responsive to detections of changes to the workflow definitions and/or computational modules, identify computational workflows defined by workflow definitions impacted by the detected changes. Workflow definitions impacted by the detected changes may include individual workflow definitions that specify computational modules impacted by the detected changes. By way of non-limiting illustration, the first computational workflow may be identified, responsive to a first detection of change to the first workflow definition.

The user component may be configured to identify, based on information included in the user repository, users associated with the identified computational workflows. By way of non-limiting illustration, the first user may be identified as being associated with an identified computational workflow. The identified computational workflow may be the first computational workflow.

The notification component may be configured to generate notifications for the identified users. The notification may indicate the identified computational workflow associated with the identified users and/or other information. By way of non-limiting illustration, a first notification may be generated for the first user. The first notification may indicate the first computational workflow and/or other information.

The notification component may be configured to output the notifications to the identified users. By way of non-limiting illustration, the first notification may be outputted to the first user.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
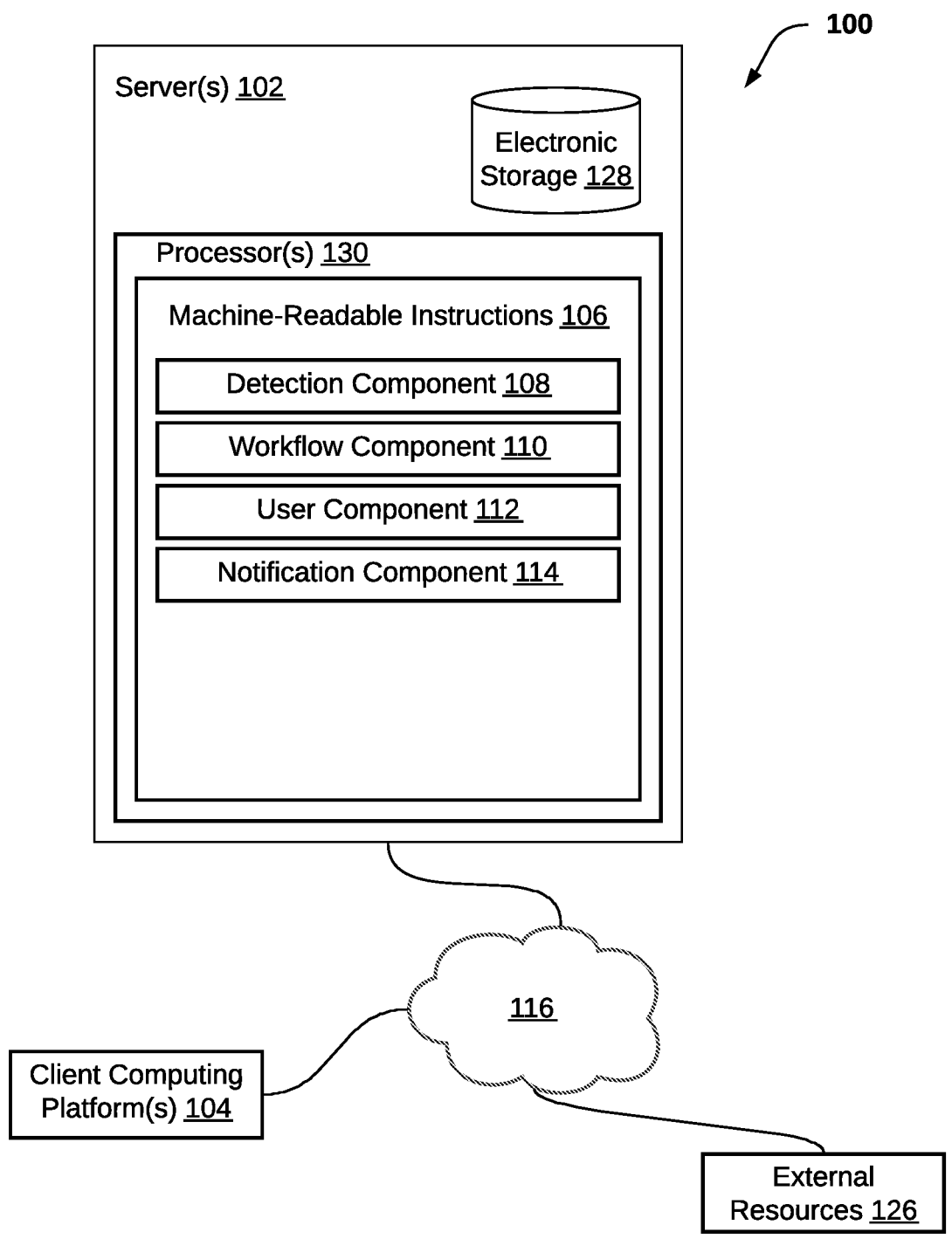
FIG. 1 illustrates a system for identifying changes to computational workflows and generating notifications, in accordance with one or more implementations.

FIG. 1 illustrates a system 100 configured for identifying changes to computational workflows and generating notifications, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of detection component 108, workflow component 110, user component 112, notification component 114, and/or other instruction components.

Electronic storage 128 may be configured to store workflow repository, a user repository, and/or other information. The workflow repository may include workflow definitions, computational modules, and/or other information. The workflow definitions may define computational workflows by specifying computational modules and/or relative orders of computational modules to configure the computational workflows. Computational modules may define separate sets of operations to perform on module inputs to the computational modules to generate module outputs. Computational workflows may be used to process input information sets to generate output information sets. Generating the output information sets may include processing input information sets in accordance with the workflow definitions. Computational workflows may receive input information sets and/or other information. The sets of operations defined by the computational modules may be performed on the input information sets in an order according to the relative orders of computational modules specified by the workflow definitions. In some implementations, relative orders of computational modules may include one or more sets of adjacent computational modules. The adjacent computational modules may include a providing computational module and a receiving computational module. Module outputs produced by the providing computational module and/or information derived thereof may be provided as module input to the receiving computational module. The set of operations defined by the receiving computational module may be performed on the module input to the receiving computational module (i.e., the module output from the providing computational module).

Individual ones of the computational modules may be configured to perform transformations, conversions, analysis, and/or other types of processes on module input(s) to the computational module to produce module output(s). By way of non-limiting illustration, individual computational modules may include sets of computational operations to perform on module inputs having a first format to produce module outputs having a second format. The first format may be different than the second format. In some implementations, computational modules may be obtained (i.e., imported) from external resources 126, via network(s) 116, and/or other components of system 100.

The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user, and the first user may be associated with the first computational workflow In some implementations, the workflow repository and/or the user repository may be a distributed repository that may be accessed by one or more users. By way of non-limiting illustration, the distributed repository may be a GitHub repository, a Mercurial repository, and/or other types of repositories. In some implementations, the workflow repository may store some or all previous changes to the workflow definitions and/or computational modules. Changes to a workflow definition may include changes to one or more computational modules specified by the workflow definition. In some implementations, one or more changes to a workflow definition may generate a new version of the computational workflow defined by the workflow definitions and/or a new version of the workflow definition. Some or all previously generated versions of the computational workflow and/or workflow definition may be included (i.e., stored) in the workflow repository. Previously generated versions of the computational workflow may be obtained and/or used by a user to process input information set(s) to generate output information set(s).

In some implementations, changes to the workflow repository may be submitted (i.e., uploaded) by one or more users via one or more client computing platform(s) 104 associated with the users. Users may be capable of obtaining (i.e., checking out) one or more workflow definitions and/or computational modules for modification. The modified workflow definitions and/or computational modules may be submitted to (i.e., checked-in, uploaded, etc.) the workflow repository. In some implementations, submissions from users may indicate changes to individual workflow definitions and/or computational modules. By way of non-limiting illustration, the submissions may include one or more executable files and/or other elements. Executing the executable files may implement the indicated changes to the workflow repository.

Detection component 108 may be configured to monitor the workflow repository to detect changes to workflow definitions and/or computational modules included in the workflow repository. In some implementations, a detection of changes may be responsive to receipt of update information by detection component 108 and/or other components of system 100. Update information may be submitted by one or more users via one or more client computing platform(s) 104, obtained from external resources 126, via network(s) 116, and/or other components of system 100. The update information may indicate the change(s) to the workflow definitions and/or the computational modules included in the workflow repository. In some implementations, a detection of changes may be responsive to a modification of the workflow definitions and/or computational modules included in the workflow repository. The modification may include the implementation (i.e., execution) of changes indicated by the updated information submitted by the users. In other words, a detection of change may be responsive to a submission of first update information and/or the implementation of changes indicated by the first update information to the workflow repository (i.e., the workflow definitions and/or computational modules included in the workflow repository). The changes indicated by the first update information may be implemented responsive to the submission of first update information (i.e., automatically), approval by one or more administrative users (i.e., users having administrative permissions), and/or other actions.

In some implementations, changes to the computational modules may include modifications to the set of computational operations defined by the computational modules. Modifications (i.e., updates) to an individual set of computational operations may include adding additional operations, removing operations, modifying the order of the operations, and/or other types of modifications. The modified computational modules may replace earlier versions of the same computational modules in the workflow repository. The modified computational module may be stored in the workflow repository as a new version and/or be stored alongside with the earlier versions of the same computational module. In some implementations, a computational module and a modified version of the same computational module may be functionally analogous.

In some implementations, changes to the workflow definitions may include modifications to the relative order of computational modules specified by the workflow definitions. Modifications (i.e., updates) to the relative order of computational modules may include adding computational modules, removing computational modules, rearranging the order of computational modules, and/or other types of modifications. The modified workflow definitions may replace earlier versions of the same workflow definitions in the workflow repository. The modified workflow definitions may be stored in the workflow repository as a new version and/or be stored alongside with the earlier versions of the same workflow definitions.

In some implementations, monitoring the workflow repository may include scanning (i.e., inspecting, examining) the workflow repository and/or contents of the workflow repository to generate a repository record. The repository record may include information related to the workflow definitions and/or computational modules included in the workflow repository. Information related to the workflow definitions and/or computational modules may include version information, state information, and/or other information. The repository record may be stored in electronic storage 128 and/or other components of system 100. The workflow repository may be scanned at regular intervals of time. The intervals may be every minute, every ten minutes, every hour, every 12 hours, every 24 hours, and/or other intervals of time. Scanning the workflow repository may include comparing the newly generated repository record with one or more previously generated and/or stored repository records. A detection of changes may be responsive to differences between the newly generated repository record and the one or more stored repository records. By way of non-limiting illustration, a newly generated repository record may be compared to a stored repository record that was last and/or most recently generated.

Workflow component 110 may be configured to, responsive to detections of changes to the workflow definitions and/or computational modules, identify computational workflows defined by workflow definitions impacted by the detected changes. In some implementations, identifying computational workflows may include identifying the workflow definitions included in the workflow repository that are impacted by the detected changes. In some implementations, computational workflows may be configured and/or stored in the workflow repository or may be identified based on the workflow definitions that define the computational workflows. The detected changes may include detection component 108 receiving update information that indicates (i.e., specifies) modifications to be made to the workflow repository. The detected changes may also include the implementation of modifications to the workflow repository.

Workflow definitions impacted by the detected changes may include individual workflow definitions that specify computational modules impacted by the detected changes. By way of non-limiting illustration, a given computational module included in the workflow repository may be impacted by a detected change. Responsive to the detection of change impacting the given computational module, one or more workflow definitions that specify the given computational module and/or are included in the workflow repository may be identified. Workflow definitions impacted by the detected changes may include individual workflow definitions that specify relative orders of computational modules impacted by the detected changes. By way of non-limiting illustration, the first computational workflow may be identified, responsive to a first detection of change to the first workflow definition. The first detection of change to the first workflow definition may include changes and/or modifications to the relative order of computational modules specified by the first workflow definition.

User component 112 may be configured to identify, based on information included in the user repository, users associated with the identified computational workflows. The user repository may include information specifying one or more users. The specified users may have access permissions to the workflow repository and/or be capable of obtaining the workflow definitions and/or computational modules included in the workflow repository. In some implementations, an individual user being associated with an individual computational workflow may indicate the individual user having used the individual computational workflow to process data prior to the detection of changes. Processing data may include the individual user obtaining the computational workflow (e.g., obtaining the workflow definition that defines the computational workflow and/or configuring the computational workflow in accordance with the workflow definition) and/or processing an input information set with the computational workflow to generate an output information set. By way of non-limiting illustration, the first user may be identified as being associated with an identified computational workflow. The identified computational workflow may be the first computational workflow.

The user repository may include information related to the specified users' activity (e.g., interaction(s) with the workflow repository) and/or other information. The users' activity may determine associations between individual ones of the users and computational workflows defined by workflow definitions included in the workflow repository. An individual user's activity may include obtaining, utilizing, modifying, and/or creating one or more workflow definitions and/or computational modules included in the workflow repository. In some implementations, an individual user's activity and/or interaction with a computational workflow, workflow definition, and/or computational module must meet or exceed a threshold in order for the individual user to be associated with the computational workflow, workflow definition, and/or computational module. By way of non-limiting illustration, the user repository may include information specifying the first user and/or the first user's activity. The first user's activity may indicate a number of times the first user has used the first computational workflow to process input information sets. The first user may be associated with the first computational workflow responsive to the number meeting and/or exceeding a threshold. The threshold may indicate one time, 5 times, 10 times, and/or other numbers of uses of the first computational workflow by the first user.

Notification component 114 may be configured to generate notifications for the identified users. The notification may indicate the identified computational workflows associated with the identified users and/or include other information. In some implementations, the generated notifications may include summaries (i.e., reports) that convey the detected changes to the user in a human-readable format. The notifications may specify the workflow definitions and/or computational modules impacted by the detected changes. In some implementations, an individual notification may be generated for an individual detection of change to the workflow repository. By way of non-limiting illustration, a first notification may be generated for the first user and/or responsive to the first detection of change. The first notification may indicate the first computational workflow, and/or other information. In some implementations, the notifications may include the date and/or time that changes were detected, identify the user that submitted and/or uploaded the changes, and/or other information related to the detected changes.

In some implementations, notifications may be generated responsive to the generation of a repository report and/or subsequent to a scan of the workflow repository. The notification may be generated at regular intervals. The intervals may be the same as or similar to the interval(s) for scanning (i.e., inspecting, examining) the workflow repository and/or contents of the workflow repository. By way of non-limiting illustration, a notification may specify the differences between a newly generated repository report and a stored repository record that was last and/or most recently generated.

Notification component 114 may be configured to output the notifications to the identified users. For example, the first notification may be outputted to the first user. The notifications may be outputted to the identified users via one or more user interfaces of client computing platform(s) 104 associated with the identified users. The user interfaces may include one or more user interface elements associated with the notifications. In some implementations, an individual user interface element may be associated with an individual notification and/or a group of notifications. In some implementations, an individual user interface element may represent an individual notification specifying an individual detected change or a group of detected changes.

In some implementations, the notifications presented via the user interface(s) may provide the identified users with the option to download and/or locally (i.e., via one or more client computing platform(s)) store the modified version of (i.e., including the detected change(s)) the identified computational workflow and/or the workflow definitions and computational modules impacted by the detected changes.

In some implementations, the user repository may include information specifying a second user, the second user being associated with the first computational workflow. Responsive to a second detection of change to the first computational module, the first computational workflow may be identified based on the first workflow definition specifying a computational module impacted by the detected changes. A second notification may be generated for the second user. The second notification may indicate the first computational workflow and/or the first computational module. The second notification may be outputted to the second user.

Figure 3:
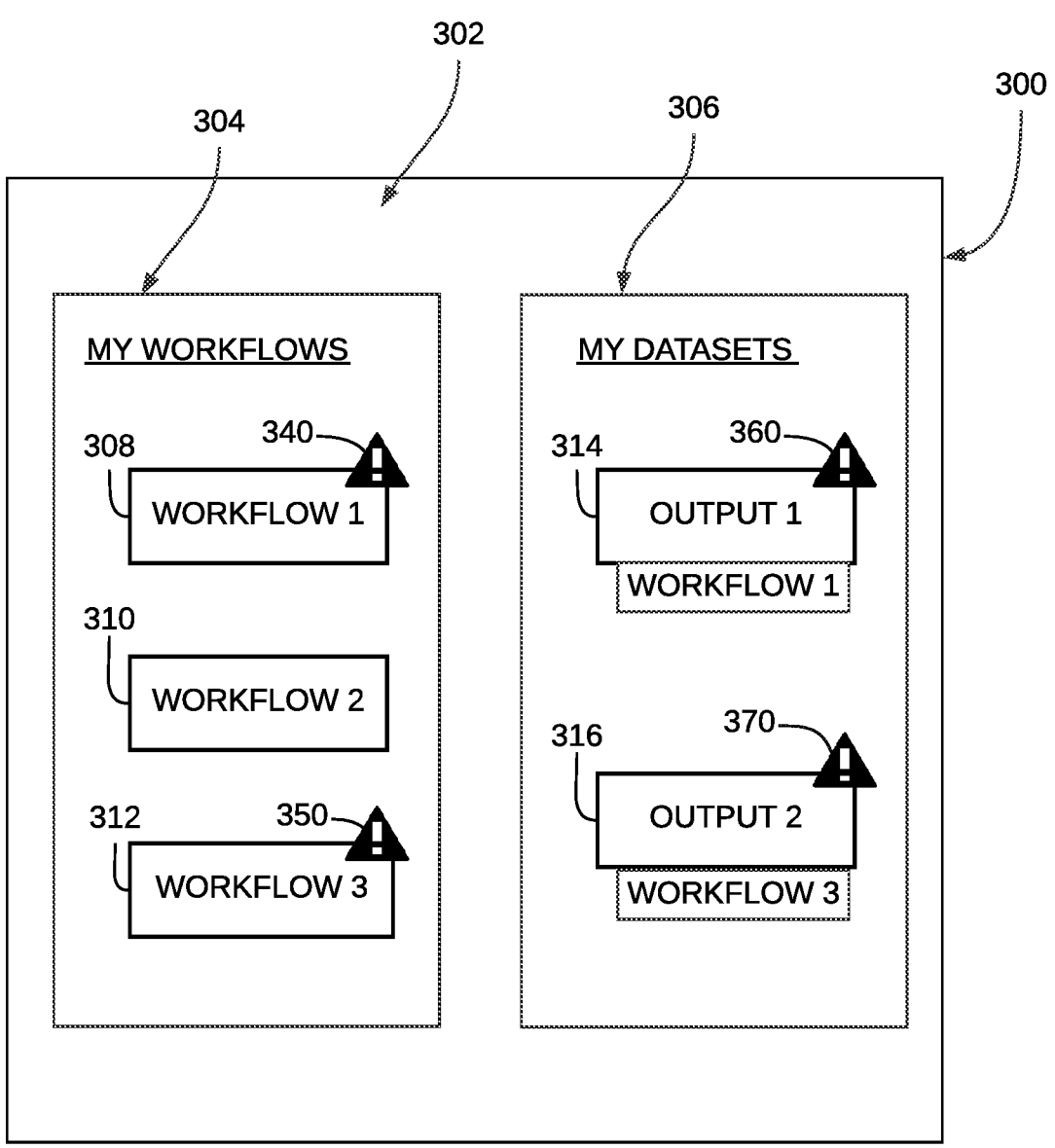
FIG. 3 illustrates a user interface, in accordance with one or more implementations.

FIG. 3 illustrates an exemplary user interface 300 that may be used by a system to identify changes to computational workflow and generate notifications, in accordance with one or more implementations. User interface 300 may present a dashboard 302 to a user via a client computing platform associated with the user. Dashboard 302 may include a first region 304, a second region 306, and/or other elements. First region 304 may include one or more user interface elements representing one or more computational workflows. The represented computational workflows may include computational workflows associated with the user. First region may include a first interface element 308, a second interface element 310, a third interface element 312, and/or other user interface elements. First interface element 308 may represent a first computational workflow, second interface element 310 may represent a second computational workflow, and third interface element 312 may represent a third computational workflow. In some implementations, the interface elements may be selectable by the user. Selection of an interface element may facilitate use of the corresponding computational workflow to process data.

Second region 306 may include one or more user interface elements representing one or more output information sets associated with the user. The output information sets may have been generated by one or more of the computational workflows represented by the user interface elements included in first region 304. Second region 306 may include a fourth interface element 314, a fifth interface element 316, and/or other user interface elements. Fourth interface element 314 may represent a first output information set. The first output information set may have been generated by processing an input information set with the first computational workflow. Fifth interface element 316 may represent a second output information set. The second output information set may have been generated by processing an input information set with the third computational workflow.

In some implementations, dashboard 302 may include one or more notification elements and/or other user interface elements. Dashboard 302 may include a first notification element 340, a second notification element 350, a third notification element 360, a fourth notification element 370, and/or other notification elements. First notification element 340 may indicate detected changes to the first computational workflow and/or a workflow definition that defines the first computational workflow. Second notification element 350 may indicate detected changes to the third computational workflow and/or a workflow definition that defines the third computational workflow. The workflow definitions defining the first and second computational workflows may be stored in a workflow repository. In some implementations, notifications may indicate output information sets generated by computational workflows defined by workflow definitions impacted by the detected changes. Third notification element 360 may be presented responsive to the detected changes to the first computational workflow. Fourth notification element 370 may be presented responsive to the detected changes to the third computational workflow.

Referring to FIG. 1, server(s) 102, client computing platform(s) 104, and/or external resources 126 may be operatively linked via one or more electronic communication links. By way of non-limiting illustration, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. By way of non-limiting illustration, server(s) 102 may be implemented by a cloud of computing platforms operating together as server(s) 102.

Electronic storage 128 may comprise non-transitory storage media that electronically stores information. In some implementations, electronic storage 128 may be configured to store one or more of the updated workflow definitions to configure the first computational module, the updated computational module, the second output information set, the variance information, and/or other information. In some implementations, the first output information set may be stored in association with the first workflow definition. The second output information set may be stored in association with the updated workflow definition. In some implementations, the updated workflow definition may be stored as a second version of the first workflow definition to configure the first computational workflow.

The electronic storage media of electronic storage 128 may include one or both of system storage that is provided integrally (i.e., substantially non-removable) with server(s) 102 and/or removable storage that is removably connectable to server(s) 102 via, By way of non-limiting illustration, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. By way of non-limiting illustration, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
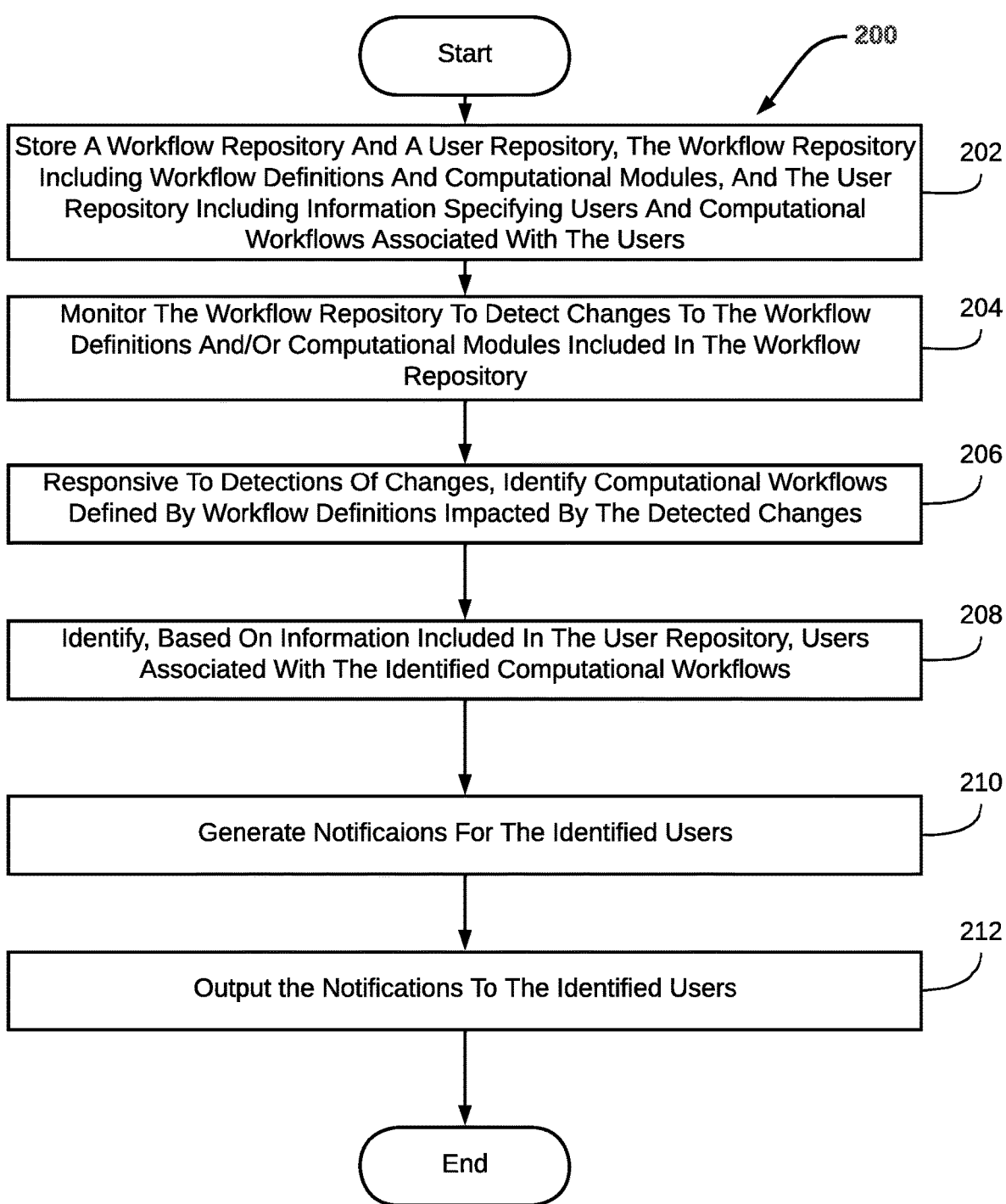
FIG. 2 illustrates a method for identifying changes to computational workflows and generating notifications, in accordance with one or more implementations.

FIG. 2 illustrates a method 200 for identifying changes to computational workflows and generating notifications, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing a workflow repository, a user repository, and/or other information. The workflow repository may include workflow definitions, computational modules, and/or other information. The workflow definitions may define computational workflows by specifying computational modules and/or relative orders of computational modules to configure the computational workflows. Computational modules may define separate sets of operations to perform on module inputs to the computational modules to generate module outputs. The user repository may include information specifying users, computational workflows associated with individual ones of the users, and/or other information. By way of non-limiting illustration, the workflow repository may include a first workflow definition defining a first computational workflow. The first workflow definition may specify a first computational module to configure the first computational workflow. The user repository may include information that specifies a first user and the first user may be associated with the first computational workflow. Operation 202 may be performed by a component that is the same as or similar to electronic storage 128, in accordance with one or more implementations.

An operation 204 may include monitoring the workflow repository to detect changes to workflow definitions and/or computational modules included in the workflow repository. By way of non-limiting illustration, changes may include updates to the workflow definitions and/or computational modules. Operation 204 may be performed by one or more hardware processors configured by machine-readable instructions including a component that is the same as or similar to detection component 108, in accordance with one or more implementations.

An operation 206 may include identifying, responsive to detections of changes to the workflow definitions and/or computational modules, computational workflows defined by workflow definitions impacted by the detected changes. Workflow definitions impacted by the detected changes may include individual workflow definitions that specify computational modules impacted by the detected changes. By way of non-limiting illustration, the first computational workflow may be identified, responsive to a first detection of change to the first workflow definition. Operation 206 may be performed by one or more hardware processors configured by machine-readable instructions including a component that is the same as or similar to workflow component 110, in accordance with one or more implementations.

An operation 208 may include identifying, based on information included in the user repository, users associated with the identified computational workflows. By way of non-limiting illustration, the first user may be identified as being associated with an identified computational workflow. The identified computational workflow may be the first computational workflow. Operation 208 may be performed by one or more hardware processors configured by machine-readable instructions including a component that is the same as or similar to user component 112, in accordance with one or more implementations.

An operation 210 may include generating notifications for the identified users. The notification may indicate the identified computational workflow associated with the identified users and/or other information. By way of non-limiting illustration, a first notification may be generated for the first user. The first notification may indicate the first computational workflow, and/or other information. Operation 210 may be performed by one or more hardware processors configured by machine-readable instructions including a component that is the same as or similar to notification component 114, in accordance with one or more implementations.

An operation 212 may include outputting the notifications to the identified users. By way of non-limiting illustration, the first notification may be outputted to the first user. Operation 212 may be performed by one or more hardware processors configured by machine-readable instructions including a component that is the same as or similar to notification component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. By way of non-limiting illustration, it is to be understood that the present technology contemplates that, to the extent possible, one or more features of any implementation can be combined with one or more features of any other implementation.

What is claimed:

1. A system configured to identify changes to computational workflows that operate on biological data and modify user interfaces based on the changes, the system comprising:

electronic storage that stores a workflow repository and a user repository, wherein the workflow repository includes workflow definitions and computational modules, wherein the workflow definitions define computational workflows by specifying the computational modules and/or relative orders of the computational modules to configure the computational workflows, wherein the computational modules define separate sets of computational operations to perform on module inputs to the computational modules to generate module outputs, wherein the user repository includes user information specifying users and the computational workflows associated with individual ones of the users, such that the workflow repository includes a first workflow definition defining a first computational workflow, the first workflow definition specifying a first computational module to configure the first computational workflow, the user repository including first user information that specifies a first user and the first user being associated with the first computational workflow;

one or more physical processors configured by machine-readable instructions to:

monitor the workflow repository to detect changes to the workflow definitions and/or the computational modules included in the workflow repository, wherein the changes include updates to the workflow definitions and/or the computational modules;

responsive to detections of the changes to the workflow definitions and/or the computational modules, identify computational workflows defined by workflow definitions impacted by the detected changes, wherein the workflow definitions impacted by the detected changes include individual workflow definitions that specify computational modules impacted by the detected changes, such that the first computational workflow is identified, responsive to a first detection of a first change to the first workflow definition;

identify, based on the user information included in the user repository, users associated with the identified computational workflows that have been impacted by the identified changes, such that the first user is identified as being associated with the first computational workflow based on the first user information, and wherein a second user is not identified as being associated with the first computational workflow;

generate notifications for the identified users, wherein the notifications pertain to the identified computational workflows that have been impacted by the identified changes, such that a first notification is generated for the first user due to the first detection of the first change to, the first computational workflow;

present a first user interface to the first user through a first client computing platform, wherein the first user interface includes a first user interface element that represents the first computational workflow;

modify the first user interface by presenting a particular graphical user interface element on the first user interface, wherein the modified first user interface is presented to the first user through the first client computing platform, wherein presenting the particular graphical user interface element is based on the first notification;

use, by a second user, the first computational workflow;

responsive to the use of the first computational workflow by the second user, add particular information to the first user information in the user repository stored in the electronic storage such that the second user is associated with the first computational workflow by virtue of the added particular information that has been added to the first user information;

responsive to a second detection of a second change to the first workflow definition, identify the first computational workflow as being impacted by the second change;

identify, based on the first user information included in the user repository, both the first user and the second user as being associated with the first computational workflow that has been impacted by the second change, wherein the second user is identified by virtue of the particular information that has been added to the first user information in the user repository;

responsive to identification of both the first user and the second user, generate a second notification for the first user and the second user due to the second detection of the second change to the first workflow definition;

present a second user interface to the second user through a second client computing platform, wherein the second user interface includes a second user interface element that represents the first computational workflow; and modify the second user interface by presenting the particular graphical user interface element on the second user interface, wherein the modified second user interface is presented to the second user through the second client computing platform, wherein presenting the particular graphical user interface element is based on the second notification.

2. The system of claim 1, wherein the first computational workflow is identified as being impacted based on the first workflow definition specifying the first computational module being impacted by the second change.

3. The system of claim 1, wherein an individual user being associated with an individual computational workflow indicates the individual user having used the individual computational workflow to process the biological data prior to the detection of the changes.

4. The system of claim 1, wherein an individual user being associated with an individual computational workflow indicates the individual user using the individual computational workflow to operate on the biological data.

5. The system of claim 1, wherein the changes to the workflow definitions include uploads of update information by users, and wherein the update information specifies the changes to at least one of the workflow definitions and/or the computational modules included in the workflow repository.

6. The system of claim 1, wherein the changes to workflow definitions include modifications to the relative orders of computational modules specified by the workflow definitions.

7. The system of claim 1, wherein the changes to the computational modules include modifications to the separate sets of computational operations defined by the computational modules.

8. The system of claim 7, wherein the modifications to an individual set of computational operations include one or more of adding additional operations, removing operations, and/or modifying an order of the computational operations.

9. The system of claim 1, wherein the computational modules that are included in the workflow repository operate on the biological data, and wherein the detected changes to the first computational workflow impact the first computational module by creating a modified version of the first computational module.

10. The system of claim 1, wherein identifying the users that are associated with the identified computational workflows occurs automatically.

11. The system of claim 9, wherein the modified version of the first computational module is functionally analogous to the first computational module prior to the detected changes.

12. The system of claim 1, wherein the particular information is added to the first user information in the user repository responsive to the use of the first computational workflow by the second user exceeding a threshold of usage.

13. A method for identifying changes to computational workflows that operate on biological data and modifying user interfaces based on the changes, the method comprising:

storing a workflow repository and a user repository, wherein the workflow repository includes workflow definitions and computational modules, wherein the workflow definitions define computational workflows by specifying the computational modules and/or relative orders of the computational modules to configure the computational workflows, wherein the computational modules define separate sets of computational operations to perform on module inputs to the computational modules to generate module outputs, wherein the user repository includes user information specifying users and the computational workflows associated with individual ones of the users, such that the workflow repository includes a first workflow definition defining a first computational workflow, the first workflow definition specifying a first computational module to configure the first computational workflow, the user repository including first user information that specifies a first user and the first user being associated with the first computational workflow;

monitoring the workflow repository to detect changes to the workflow definitions and/or the computational modules included in the workflow repository, wherein the changes include updates to the workflow definitions and/or the computational modules;

responsive to detections of the changes to the workflow definitions and/or the computational modules, identifying computational workflows defined by workflow definitions impacted by the detected changes, wherein the workflow definitions impacted by the detected changes include individual workflow definitions that specify computational modules impacted by the detected changes, such that the first computational workflow is identified, responsive to a first detection of a first change to the first workflow definition;

identifying, based on the user information included in the user repository, users associated with the identified computational workflows that have been impacted by the identified changes, such that the first user is identified as being associated with the first computational workflow based on the first user information, and wherein a second user is not identified as being associated with the first computational workflow;

generating notifications for the identified users, wherein the notifications pertain to the identified computational workflows that have been impacted by the identified changes, such that a first notification is generated for the first user due to the first detection of the first change to, the first computational workflow;

presenting a first user interface to the first user through a first client computing platform, wherein the first user interface includes a first user interface element that represents the first computational workflow;

modifying the first user interface by presenting a particular graphical user interface element on the first user interface, wherein the modified first user interface is presented to the first user through the first client computing platform, wherein presenting the particular graphical user interface element is based on the first notification;

using, by a second user, the first computational workflow;

responsive to the use of the first computational workflow by the second user, adding particular information to the first user information in the user repository stored in the electronic storage such that the second user is associated with the first computational workflow by virtue of the added particular information that has been added to the first user information;

responsive to a second detection of a second change to the first workflow definition, identifying the first computational workflow as being impacted by the second change;

identifying, based on the first user information included in the user repository, both the first user and the second user as being associated with the first computational workflow that has been impacted by the second change, wherein the second user is identified by virtue of the particular information that has been added to the first user information in the user repository;

responsive to identification of both the first user and the second user, generating a second notification for the first user and the second user due to the second detection of the second change to the first workflow definition;

presenting a second user interface to the second user through a second client computing platform, wherein the second user interface includes a second user interface element that represents the first computational workflow; and modifying the second user interface by presenting the particular graphical user interface element on the second user interface, wherein the modified second user interface is presented to the second user through the second client computing platform, wherein presenting the particular graphical user interface element is based on the second notification.

14. The method of claim 13, wherein the first computational workflow is identified as being impacted based on the first workflow definition specifying the first computational module being impacted by the second change.

15. The method of claim 13, wherein an individual user being associated with an individual computational workflow indicates the individual user having used the individual computational workflow to process the biological data prior to the detection of the changes.

16. The method of claim 13, wherein an individual user being associated with an individual computational workflow indicates the individual user using the individual computational workflow to operate on the biological data.

17. The method of claim 13, wherein the changes to the workflow definitions include uploads of update information by users, and wherein the update information specifies the changes to at least one of the workflow definitions and/or computational modules included in the workflow repository.

18. The method of claim 13, wherein the changes to workflow definitions include modifications to the relative orders of computational modules specified by the workflow definitions.

19. The method of claim 13, wherein the changes to the computational modules include modifications to the separate sets of computational operations defined by the computational modules.

20. The method of claim 19, wherein the modifications to an individual set of computational operations include one or more of adding one or more of additional operations, removing operations, and/or modifying an order of the computational operations.

* * * * *